United States Patent
Shigemitsu

(10) Patent No.: US 9,221,927 B2
(45) Date of Patent: Dec. 29, 2015

(54) GOLF BALL RESIN COMPOSITION AND GOLF BALL

(71) Applicant: DUNLOP SPORTS CO., LTD., Kobe-shi, Hyogo (JP)

(72) Inventor: Takahiro Shigemitsu, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 154 days.

(21) Appl. No.: 13/728,503

(22) Filed: Dec. 27, 2012

(65) Prior Publication Data

US 2013/0172115 A1   Jul. 4, 2013

(30) Foreign Application Priority Data

Dec. 28, 2011   (JP) ................................ 2011-289986

(51) Int. Cl.
| | |
|---|---|
| A63B 37/00 | (2006.01) |
| C08K 5/098 | (2006.01) |
| C08F 20/02 | (2006.01) |

(52) U.S. Cl.
CPC ............. *C08F 20/02* (2013.01); *A63B 37/0039* (2013.01); *A63B 37/0045* (2013.01); *A63B 37/0075* (2013.01); *C08K 5/098* (2013.01)

(58) Field of Classification Search
None
See application file for complete search history.

(56) References Cited

U.S. PATENT DOCUMENTS

| | | | |
|---|---|---|---|
| 5,306,760 A | 4/1994 | Sullivan | |
| 5,312,857 A | 5/1994 | Sullivan | |
| 6,100,321 A * | 8/2000 | Chen | 524/400 |
| 6,329,458 B1 | 12/2001 | Takesue et al. | |
| 6,653,382 B1 | 11/2003 | Statz et al. | |
| 6,746,345 B2 * | 6/2004 | Higuchi et al. | 473/371 |
| 7,803,861 B1 * | 9/2010 | Binette | 524/322 |
| 2001/0018375 A1 | 8/2001 | Hayashi et al. | |
| 2002/0099120 A1 | 7/2002 | Takesue et al. | |
| 2005/0267240 A1 * | 12/2005 | Chen | 524/322 |
| 2010/0216574 A1 | 8/2010 | Umezawa et al. | |
| 2011/0082245 A1 * | 4/2011 | Iizuka et al. | 524/322 |
| 2011/0092312 A1 * | 4/2011 | Shigemitsu | 473/373 |
| 2013/0172109 A1 * | 7/2013 | Shiga et al. | 473/372 |
| 2013/0172110 A1 * | 7/2013 | Shiga et al. | 473/372 |
| 2013/0172114 A1 * | 7/2013 | Shigemitsu | 473/373 |
| 2013/0172116 A1 * | 7/2013 | Shigemitsu | 473/373 |

FOREIGN PATENT DOCUMENTS

| | | |
|---|---|---|
| CN | 1413230 A | 4/2003 |
| JP | 4-208246 A | 7/1992 |
| JP | 6-292740 A | 10/1994 |
| JP | 7-292068 A | 11/1995 |
| JP | 2000-157646 A | 6/2000 |
| JP | 2001-218873 A | 8/2001 |
| JP | 2002-219195 A | 8/2002 |
| JP | 2010-194314 A | 9/2010 |
| WO | WO 94/24204 A2 | 10/1994 |

OTHER PUBLICATIONS

English translation of Japanese Office Action, issued Sep. 1, 2015, for Japanese Application No. 2011-289986.

* cited by examiner

*Primary Examiner* — David Buttner
(74) *Attorney, Agent, or Firm* — Birch, Stewart, Kolasch & Birch, LLP

(57) ABSTRACT

A golf ball resin composition that is excellent in resilience includes (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and (B) a basic metal salt of a fatty acid.

18 Claims, No Drawings

GOLF BALL RESIN COMPOSITION AND GOLF BALL

FIELD OF THE INVENTION

The present invention relates to an improvement in resilience of a golf ball resin composition comprising an ionomer resin.

DESCRIPTION OF THE RELATED ART

As a golf ball construction, a two-piece golf ball comprising a core and a cover, a three-piece golf ball comprising a core, a single-layered intermediate layer covering the core, and a cover covering the intermediate layer, and a multi-piece golf ball comprising a core, at least two intermediate layers covering the core, and a cover covering the intermediate layers are known. Ionomer resins are used as materials constituting each layer of golf balls. Use of the ionomer resins as the constituent member of the golf ball provides the golf ball traveling a great distance, because of its high stiffness. Accordingly, ionomer resins are widely used as a material constituting a cover or an intermediate layer of the golf ball. However, there still remains a room for further improvement with respect to the stiffness and fluidity thereof and various improvements have been proposed for improving these properties.

Japanese Patent Publication No. 2000-157646 A discloses a golf ball cover composition having a melt index (MI) of 1 dg/sec. or more and primarily comprising a mixture of a base resin, blended with (d) a metal soap obtained by neutralizing an organic acid having up to 29 carbon atoms with a monovalent to trivalent metal ion, in a mass ratio of the base resin to the metal soap being 95:5 to 80:20, wherein the base resin comprises an ionomer resin component containing (a) a ternary ionomer resin consisting of a metal ion neutralized product of an olefin-unsaturated carboxylic acid-unsaturated carboxylate copolymer having an acid content of 12 wt % or less, and (b) a binary ionomer resin consisting of a metal ion neutralized product of an olefin-unsaturated carboxylic acid copolymer having an acid content of 15 wt % or less in a ratio of 40:60 to 100:0; and (c) an unneutralized random copolymer composed of an olefin and an unsaturated carboxylic acid monomer, in a mass ratio of the ionomer resin component to (c) the unneutralized random copolymer being 75:25 to 100: 0.

U.S. Pat. No. 5,306,760 discloses a golf ball comprising a core and a cover, wherein the cover essentially consists of 100 parts by weight of at least one ionomer resin and from about 25 to about 100 parts by weight of a metal stearate, wherein said ionomer resin is the reaction product of an olefin having 2 to 8 carbon atoms and an unsaturated monocarboxylic acid having 3 to 8 carbon atoms.

U.S. Pat. No. 5,312,857 discloses a golf ball comprising a core and a cover, wherein the cover essentially consists of 100 parts by weight of at least one ionomer resin and from about 25 to about 100 parts by weight of a fatty acid metal salt, wherein said ionomer resin is the reaction product of an olefin having 2 to 8 carbon atoms and an unsaturated monocarboxylic acid having 3 to 8 carbon atoms.

Japanese Patent Publication No. H06-292740 A discloses a composition for a golf ball cover material which comprises (A) 15 to 90 parts by weight of metal salts of an ethylene/unsaturated carboxylic acid copolymer having an unsaturated carboxylic acid content of 10 to 30% by weight and a degree of neutralization of at least of 25 mole % and (B) 85 to 10 parts by weight of an ethylene/(meth)acrylate ester/unsaturated carboxylic acid terpolymer having a (meth)acrylate ester content of 12 to 45% by weight and an unsaturated carboxylic acid content of 0.5 to 5% by weight.

Japanese Patent Publication No. 2001-218873 A discloses a multi-piece golf ball comprising a solid core, an intermediate layer enclosing the solid core, and a cover enclosing the intermediate layer, wherein at least one of said intermediate layer and said cover is formed of a heated mixture comprising (a) 100 parts by weight of an olefin-unsaturated carboxylic acid random copolymer or an olefin-unsaturated carboxylic acid-unsaturated carboxylate random copolymer or both of them, (b) 5 to 80 parts by weight of a fatty acid having a molecular weight of at least 280 or a derivative thereof, and (c) 0.1 to 10 parts by weight of a basic inorganic metal compound capable of neutralizing acid groups in components (a) and (b), said heated mixture having a melt index of at least 1.0 dg/min, and wherein said intermediate layer has a Shore D hardness of 40 to 63, said cover has a Shore D hardness of 45 to 68, and the Shore D hardness of said solid core at its center is not greater than the Shore D hardness of said intermediate layer, which is not greater than the Shore D hardness of said cover.

Japanese Patent Publication No. 2002-219195 A discloses a golf ball material comprising a mixture which is composed of essential components: 100 parts by weight of a resinous component consisting of a base resin and (e) a non-ionomer thermoplastic elastomer, the base resin and the elastomer being blended in a weight ratio of 100:0 to 50:50; (c) 5 to 80 parts by weight of a fatty acid and/or fatty acid derivative having a molecular weight of 280 to 1,500; and (d) 0.1 to 10 parts by weight of a basic inorganic metal compound capable of neutralizing acidic groups left unneutralized in the base resin and component (c), wherein the base resin has (a) an olefin-unsaturated carboxylic acid binary random copolymer and/or a metal ion-neutralized olefin-unsaturated carboxylic acid binary random copolymer, blended with (b) an olefin-unsaturated carboxylic acid-unsaturated carboxylate ternary random copolymer and/or a metal ion neutralized olefin-unsaturated carboxylic acid-unsaturated carboxylate ternary random copolymer, in a weight ratio of 100:0 to 25:75.

SUMMARY OF THE INVENTION

As a method to improve a flight distance of a golf ball using an ionomer resin with a high stiffness for a cover or an intermediate layer, there is a method to use an ionomer resin having a high degree of neutralization. However, since the ionomer resin having a high degree of neutralization has a low fluidity, for example, injection molding a thin cover or intermediate layer is extremely difficult. As a method of improving the fluidity of the ionomer resin, a fatty acid or a metal salt thereof are added to the ionomer resin having a high degree of neutralization. However, if the added amount is a certain amount or less, the effect of improving the fluidity is low, while if the added amount is a certain amount or more, the mechanical properties of the material are lowered, which causes a problem of the lower durability of the golf ball.

The present invention has been achieved in view of the above circumstances. An object of the present invention is to provide a golf ball resin composition excellent in resilience. Another object of the present invention is to provide a golf ball excellent in resilience and durability.

The present invention provides a golf ball resin composition comprising (A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and (B) a basic metal salt of a fatty acid.

(B) The basic metal salt of the fatty acid used in the present invention has stronger basicity than a general metal salt of a fatty acid, and effectively neutralizes unneutralized carboxyl groups in (A) the resin component. As a result, the degree of neutralization of (A) the resin component increases, and thus the resilience of the obtained golf ball resin component is improved. Further, (B) the basic metal salt of the fatty acid has an action of enhancing the fluidity concurrently. Therefore, a reduction in durability associated with the addition of a fatty acid or a metal salt thereof is suppressed. The golf ball of the present invention using (B) the basic metal salt of the fatty acid has superior resilience and durability than the golf ball containing a basic inorganic metal compound and a fatty acid respectively.

According to the present invention, the golf ball resin composition with an excellent resilience is obtained. Use of the golf ball resin composition of the present invention provides a golf ball with an excellent resilience and durability.

DESCRIPTION OF THE PREFERRED EMBODIMENT

The present invention provides a golf ball resin composition comprising (A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and (B) a basic metal salt of a fatty acid.

First, (A) at least one resin component selected from the group consisting of (a-1) the binary copolymer composed of an olefin and an α,β-unsaturated carboxylic acid having 3 to 8 carbon atoms; (a-2) the ionomer resin consisting of a metal ion-neutralized product of a binary copolymer composed of an olefin and an α,β-unsaturated carboxylic acid having 3 to 8 carbon atoms; (a-3) the ternary copolymer composed of an olefin, an α,β-unsaturated carboxylic acid having 3 to 8 carbon atoms, and an α,β-unsaturated carboxylic acid ester; and (a-4) the ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester will be explained.

(a-1) component is a nonionic binary copolymer composed of an olefin and an α,β-unsaturated carboxylic acid having 3 to 8 carbon atoms wherein the carboxyl groups thereof are not neutralized. Further, (a-2) component includes an ionomer resin prepared by neutralizing at least a part of carboxyl groups in the binary copolymer composed of an olefin and α,β-unsaturated carboxylic acid having 3 to 8 carbon atoms with a metal ion.

(a-3) component is a nonionic ternary copolymer composed of an olefin, an α,β-unsaturated carboxylic acid having 3 to 8 carbon atoms, and an α,β-unsaturated carboxylic acid ester wherein the carboxyl groups thereof are not neutralized. (a-4) component includes an ionomer resin prepared by neutralizing at least a part of carboxyl groups in the ternary copolymer composed of an olefin and α,β-unsaturated carboxylic acid having 3 to 8 carbon atoms, and an α,β-unsaturated carboxylic acid ester with a metal ion.

In the present invention, "(a-1) the binary copolymer composed of an olefin and an α,β-unsaturated carboxylic acid having 3 to 8 carbon atoms" is sometimes merely referred to as "binary copolymer". "(a-2) The ionomer resin consisting of a metal ion-neutralized product of a binary copolymer composed of an olefin and an α,β-unsaturated carboxylic acid having 3 to 8 carbon atoms" is sometimes referred to as "the binary ionomer resin". "(a-3) The ternary copolymer composed of an olefin, an α,β-unsaturated carboxylic acid having 3 to 8 carbon atoms, and an α,β-unsaturated carboxylic acid ester" is sometimes merely referred to as "ternary copolymer". "(a-4) The ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester" is sometimes referred to as "the ternary ionomer resin".

The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable.

(a-1) The binary copolymer preferably includes a binary copolymer composed of ethylene and (meth)acrylic acid. (a-2) The binary ionomer resin preferably includes the metal ion-neutralized product of the binary copolymer composed of ethylene-(meth)acrylic acid. (a-3) The ternary copolymer preferably includes a ternary copolymer composed of ethylene, (meth)acrylic acid, and (meth)acrylic acid ester. (a-4) The ternary ionomer resin preferably includes the metal ion-neutralized product of the ternary copolymer composed of ethylene, (meth)acrylic acid, and (meth)acrylic acid ester. Here, (meth)acrylic acid means acrylic acid and/or methacrylic acid.

The content of the α,β-unsaturated carboxylic acid component having 3 to 8 carbon atoms in (a-1) the binary copolymer or (a-3) the ternary copolymer is preferably 4 mass % or more, more preferably 5 mass % or more, and is preferably 30 mass % or less, more preferably 25 mass % or less.

The melt flow rate (190° C., 2.16 kg) of (a-1) the binary copolymer or (a-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, even more preferably 1,300 g/10 min or less. If the melt flow rate (190° C., 2.16 kg) of (a-1) the binary copolymer or (a-3) the ternary copolymer is 5 g/10 min or more, the golf ball resin composition has better fluidity, and thus it is easier to mold a constituent member. If the melt flow rate (190° C., 2.16 kg) of (a-1) the binary copolymer or (a-3) the ternary copolymer is 1,700 g/10 min or less, the resultant golf ball has better durability.

Specific examples of (a-1) the binary copolymer include an ethylene-methacrylic acid copolymer such as "NUCREL (registered trademark) (e.g. NUCREL N1050H, NUCREL N2050H, NUCREL N1110H, NUCREL N0200H) manufactured by Du Pont-Mitsui Polychemicals Co, and an ethylene-acrylic acid copolymer such as "PRIMACORE (registered trademark) 5980I" available from Dow Chemical Company.

Specific examples of (a-3) the ternary copolymer include "NUCREL (registered trademark) (e.g. NUCREL AN4318, NUCREL AN4319) manufactured by Du Pont-Mitsui Polychemicals Co, and "NUCREL (registered trademark) (e.g. NUCREL AE) manufactured by E.I. du Pont de Nemours and Company, and "PRIMACORE (registered trademark) (e.g. PRIMCOR AT310, PRIMCOR AT320) available from Dow Chemical Company. (a-1) The binary copolymer or (a-3) the ternary copolymer may be used alone or as a mixture of at least two of them.

The content of the α,β-unsaturated carboxylic acid having 3 to 8 carbon atoms of (a-2) the binary ionomer resin is preferably 15 mass % or more, more preferably 16 mass % or more, and even more preferably 17 mass % or more, and is preferably 30 mass % or less, more preferably 25 mass % or less. If the content of the α,β-unsaturated carboxylic acid having 3 to 8 carbon atoms is 15 mass % or more, the resultant constituent member has a desirable hardness. If the content of the α,β-unsaturated carboxylic acid having 3 to 8 carbon atoms is 30 mass % or less, since the hardness of the resultant constituent member does not become excessively high, the durability and shot feeling become better.

The degree of neutralization of the carboxyl groups contained in (a-2) the binary ionomer resin is preferably 15 mole % or more, more preferably 20 mole % or more, and is preferably 90 mole % or less, more preferably 85 mole % or less. If the degree of neutralization is 15 mole % or more, the resultant golf ball has better resilience and durability. On the other hand, if the degree of neutralization is 90 mole % or less, the golf ball resin composition has better fluidity (good moldability). The degree of neutralization of the carboxyl groups of (a-2) the binary ionomer resin can be calculated by the following expression.

Degree of neutralization (mole %) of the binary ionomer resin=(the number of moles of carboxyl groups neutralized in the binary ionomer resin/the number of moles of all carboxyl groups contained in the binary ionomer resin)×100

Examples of a metal ion used for neutralizing at least a part of carboxyl groups of (a-2) the binary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-2) the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn))" commercially available from Du Pont-Mitsui Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

(a-2) The binary ionomer resins may be used alone or as a mixture of at least two of them. It is noted that Na, Zn, Li, and Mg described in the parentheses after the trade names indicate metal types of neutralizing metal ions of the binary ionomer resins.

(a-2) The binary ionomer resin preferably has a bending stiffness of 140 MPa or more, more preferably 150 MPa or more, and even more preferably 160 MPa or more, and preferably has a bending stiffness of 550 MPa or less, more preferably 500 MPa or less, even more preferably 450 MPa or less. If the bending stiffness of (a-2) the binary ionomer resin is too low, the flight distance tends to be shorter because of the increased spin rate of the golf ball. If the bending stiffness is too high, the durability of the golf ball may be lowered.

(a-2) The binary ionomer resin preferably has the melt flow rate (190° C., 2.16 kg) of 0.1 g/10 min or more, more preferably 0.5 g/10 min or more, and even more preferably 1.0 g/10 min or more, and preferably has the melt flow rate (190° C., 2.16 kg) of 30 g/10 min or less, more preferably 20 g/10 min or less, and even more preferably 15 g/10 min or less. If the melt flow rate of (a-2) the binary ionomer resin is 0.1 g/10 min or more, the golf ball resin composition has better fluidity and thus it is easy to mold the thin layer. If the melt flow rate of (a-2) the binary ionomer resin is 30 g/10 min or less, the durability of the resultant golf ball becomes better.

(a-2) The binary ionomer resin preferably has a slab hardness of 50 or more, more preferably 55 or more, even more preferably 60 or more, and preferably has a slab hardness of 75 or less, more preferably 73 or less, even more preferably 70 or less in Shore D hardness. If the binary ionomer resin has a slab hardness of 50 or more in Shore D hardness, the resultant constituent member has a high hardness. On the other hand, if the binary ionomer resin has a slab hardness of 75 or less in Shore D hardness, the resultant constituent member does not become excessively hard, and thus the golf ball has better durability.

The content of the α,β-unsaturated carboxylic acid having 3 to 8 carbon atoms in (a-4) the ternary ionomer resin is preferably 2 mass % or more, more preferably 3 mass % or more, and is preferably 30 mass % or less, more preferably 25 mass % or less.

The degree of neutralization of the carboxyl groups contained in (a-4) the ternary ionomer resin is preferably 20 mole % or more, more preferably 30 mole % or more, and is preferably 90 mole % or less, more preferably 85 mole % or less. If the degree of neutralization is 20 mole % or more, the resultant golf ball obtained by using the golf ball resin composition of the present invention has better resilience and durability. If the degree of neutralization is 90 mole % or less, the golf ball resin composition has better fluidity (good moldability). The degree of neutralization of the carboxyl groups in the ionomer resin can be calculated by the following expression.

Degree of neutralization (mole %) of the ionomer resin=(the number of moles of carboxyl groups neutralized in the ionomer resin/the number of moles of all carboxyl groups contained in the ionomer resin)×100

Examples of a metal ion used for neutralizing at least a part of carboxyl groups of (a-4) the ternary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-4) the ternary ionomer resin include trade name "Himilan (registered trademark) (e.g. Himilan AM7327 (Zn), Himilan 1855 (Zn), Himilan 1856 (Na), Himilan AM7331 (Na), or the like)" commercially available from Du Pont-Mitsui Polychemicals Co., Ltd. Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn), HPF1000 (Mg), HPF2000 (Mg) or the like)". The ionomer resins commercially available from ExxonMobil Chemical Corporation include trade name "Iotek (registered trademark) (e.g. Iotek 7510 (Zn), Iotek 7520 (Zn) or the like)". It is noted that Na, Zn and Mg described in the parentheses after the trade names indicate metal types of neutralizing metal ions. (a-4) The ternary ionomer resins may be used alone or as a mixture of at least two of them.

(a-4) The ternary ionomer resin preferably has a bending stiffness of 10 MPa or more, more preferably 11 MPa or more, even more preferably 12 MPa or more, and preferably has a bending stiffness of 100 MPa or less, more preferably 97 MPa or less, even more preferably 95 MPa or less. If the bending stiffness of (a-4) the ternary ionomer resin is too low, the flight distance tends to be shorter because of the increased spin rate of the golf ball. If the bending stiffness is too high, the durability of the golf ball may be lowered.

(a-4) The ternary ionomer resin preferably has the melt flow rate (190° C., 2.16 kg) of 0.1 g/10 min or more, more preferably 0.3 g/10 min or more, and even more preferably 0.5 g/10 min or more, and preferably has the melt flow rate (190° C., 2.16 kg) of 20 g/10 min or less, more preferably 15 g/10 min or less, even more preferably 10 g/10 min or less. If the melt flow rate (190° C., 2.16 kg) of (a-4) the ternary ionomer resin is 0.1 g/10 min or more, the golf ball resin composition has better fluidity and thus it is easy to mold a thin layer. If the melt flow rate (190° C., 2.16 kg) of (a-4) the ternary ionomer resin is 20 g/10 min or less, the durability of the resultant golf ball becomes better.

(a-4) The ternary ionomer resin preferably has a slab hardness of 20 or more, more preferably 25 or more, even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant constituent member does not become excessively soft and thus the golf ball has higher resilience. If the ternary ionomer resin has a slab hardness of 70 or less in Shore D hardness, the resultant constituent member does not become excessively hard and thus the golf ball has better durability.

As (A) the resin component, (a-1) the binary copolymer, (a-2) the binary ionomer resin, (a-3) the ternary copolymer, and (a-4) the ternary ionomer resin may be used alone or as a mixture of at least two of them. The golf ball resin composition of the present invention preferably includes (a-3) the ternary copolymer or (a-4) the ternary ionomer resin as (A) the resin component, because the resultant constituent member does not become excessively hard, and thus the golf ball has higher resilience.

Next, (B) the basic metal salt of the fatty acid is described. (B) The basic metal salt of the fatty acid is obtained by a well-known producing method where a fatty acid is allowed to react with a metal oxide or metal hydroxide. A general metal salt of a fatty acid is obtained by a reaction of a fatty acid with a metal oxide or metal hydroxide in an amount of the reaction equivalent, whereas a basic metal salt of a fatty acid is obtained by adding a metal oxide or metal hydroxide in an excessive amount which is larger than the reaction equivalent to a fatty acid. The metal content, melting point or the like of the product are different from those of a general metal salt of a fatty acid.

As (B) the basic metal salt of the fatty acid, preferred is a basic metal salt of a fatty acid represented by the following general formula (1).

$$mM^1O \cdot M^2(RCOO)_2 \quad (1)$$

In formula (1), m represents the number of moles of metal oxides or metal hydroxides in the basic metal salt of the fatty acid. m preferably ranges from 0.1 to 2.0, and more preferably from 0.2 to 1.5. If m is less than 0.1, the resilience of the obtained resin composition may be lowered, while if m exceeds 2.0, the melting point of the basic metal salt of the fatty acid becomes too high and thus it may be difficult to disperse to the resin component. As $M^1$ and $M^2$, the group II or the group XII metals of the periodic table are preferred, respectively. $M^1$ and $M^2$ may be identical or different each other. Examples of the group II metals include beryllium, magnesium, calcium, strontium and barium. Examples of the group XII metals include zinc, cadmium and mercury. Preferred is, for example, magnesium, calcium, barium or zinc, and more preferred is magnesium, as $M^1$ and $M^2$ metals.

In formula (1), RCOO means the residue of the saturated fatty acid or unsaturated fatty acid. Specific examples of the saturated fatty acid component of (B) the basic metal salt of the fatty acid (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of the unsaturated fatty acid component of (B) the basic metal salt of the fatty acid (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of the fatty acid component of (B) the basic metal salt of the fatty acid (Common name) are, for example, butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxy stearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30).

(B) The basic metal salt of the fatty acid is preferably a basic metal salt of an unsaturated fatty acid. The unsaturated fatty acid component preferably includes at least one selected from the group consisting of oleic acid (C18), erucic acid (C22), linoleic acid (C18), linolenic acid (C18), arachidonic acid (C20), eicosapentaenoic acid (C20), docosahexaenoic acid (C22), stearidonic acid (C18), nervonic acid (C24), vaccenic acid (C18), gadoleic acid (C20), elaidic acid (C18), eicosenoic acid (C20), eicosadienoic acid (C20), docosadienoic acid (C22), pinolenic acid (C18), eleostearic acid (C18), mead acid (C20), adrenic acid (C22), clupanodonic acid (C22), nishinic acid (C24), and tetracosapentaenoic acid (C24).

(B) The basic metal salt of the fatty acid is preferably a basic metal salt of a fatty acid having 8 to 30 carbon atoms, and more preferably a basic metal salt of a fatty acid having 12 to 24 carbon atoms. Specific examples of (B) the basic metal salt of the fatty acid include basic magnesium laurate, basic calcium laurate, basic zinc laurate, basic magnesium myristate, basic calcium myristate, basic zinc myristate, basic magnesium palmitate, basic calcium palmitate, basic zinc palmitate, basic magnesium oleate, basic calcium oleate, basic zinc oleate, basic magnesium stearate, basic calcium stearate, basic zinc stearate, basic magnesium 12-hydroxystearate, basic calcium 12-hydroxystearate, basic zinc 12-hydroxystearate, basic magnesium behenate, basic calcium behenate, and basic zinc behenate. (B) The basic metal salt of the fatty acid preferably includes basic magnesium fatty acid, and more preferably basic magnesium stearate, basic magnesium behenate, basic magnesium laurate, and basic magnesium oleate. (B) The basic metal salt of the fatty acid may be used alone or as a mixture of at least two of them.

There is no particular limitation on the melting point of (B) the basic metal salt of the fatty acid, but if the metal is magnesium, the melting point is preferably 100° C. or more, and is preferably 300° C. or less, more preferably 290° C. or less, even more preferably 280° C. or less. If the melting point falls within the above range, the dispersibility to the resin component becomes better.

(B) The basic metal salt of the fatty acid preferably contains the metal component in an amount of 1 mole % or more, more preferably 1.1 more % or more, and preferably contains the metal component in an amount of 2 mole % or less, more preferably 1.9 mole % or less. If the content of the metal component falls within the above range, the resilience of the obtained golf ball further improves. The content of the metal component of (B) the basic metal salt of the fatty acid is the numerical value calculated by dividing the metal amount (g) contained per 1 mole of the metal salt by the atomic weight of the metal, and is expressed in mole %.

The golf ball resin composition of the present invention preferably contains (B) the basic metal salt of the fatty acid in an amount of 25 parts by mass or more, more preferably 33 parts by mass or more, even more preferably 50 parts by mass or more, and preferably contains (B) the basic metal salt of the fatty acid in an amount of 100 parts by mass or less, with respect to 100 parts by mass of (A) the resin component. If the content of (B) the basic metal salt of the fatty acid is 25 parts by mass or more, the resilience of the golf ball improves, while if the content is 100 parts by mass or less, it is possible to suppress the lowering of the durability of the golf ball due to the increase in the low-molecular weight component.

The golf ball resin composition of the present invention preferably contains only (A) the resin component as the resin component; however, the golf ball resin composition may contain another thermoplastic elastomer or thermoplastic resin, as long as they do not impair the effect of the present invention. If the golf ball resin composition contains another thermoplastic elastomer or thermoplastic resin, the content of (A) the resin component in the resin component is preferably 50 mass % or more, more preferably 60 mass % or more, and even more preferably 70 mass % or more.

Examples of other thermoplastic elastomers are a thermoplastic polyimide elastomer having a commercial name of "Pebax (e.g. "Pebax 2533")" commercially available from Arkema K. K.; a thermoplastic polyurethane elastomer having a commercial name of "Elastollan (e.g. "Elastollan XNY85A")" commercially available from BASF Japan Ltd; a thermoplastic polyester elastomer having a commercial name of "Hytrel (e.g. "Hytrel 3548", "Hytrel 4047")" commercially available from Du Pont-Toray Co., Ltd.; a thermoplastic styrene elastomer having a commercial name of "Rabalon (e.g. "Rabalon T3221C")" commercially available from Mitsubishi Chemical Corporation; and the like.

In the present invention, the golf ball resin composition may further contain a pigment component such as a white pigment (for example, titanium oxide) and a blue pigment, a weight adjusting agent, a dispersant, an antioxidant, an ultraviolet absorber, a light stabilizer, a fluorescent material, a fluorescent brightener, and the like, as long as they do not impair the effect of the present invention.

The content of the white pigment (for example, titanium oxide) is preferably 0.5 part or more, more preferably 1 part or more, and the content of the white pigment is preferably 10 parts or less, more preferably 8 parts or less, with respect to 100 parts of the resin component by mass. If the amount of the white pigment is 0.5 part by mass or more, it is possible to impart the opacity to the resultant golf ball constituent member. Further, if the amount of the white pigment is more than 10 parts by mass, the durability of the resultant golf ball may deteriorate.

The golf ball resin composition of the present invention can be obtained, for example, by dry blending (A) component and (B) component. Further, the dry blended mixture may be extruded into the form of pellet. The dry blending may be carried out using for example, a mixer capable of blending raw materials in the form of pellet, more preferably a tumbler type mixer. Extruding can be carried out by publicly known extruders such as a single-screw kneading extruder, a twin-screw kneading extruder, and a twin-single kneading extruder.

The golf ball resin composition of the present invention preferably has a hardness of 20 or larger, more preferably 25 or larger, and even more preferably 30 or larger in shore D hardness, and the golf ball resin composition preferably has a hardness of 80 or smaller, more preferably 77 or smaller, and even preferably 75 or smaller in shore D hardness. Use of the golf ball resin composition having a hardness of 20 or larger in shore D hardness provides the golf ball excellent in the resilience (flying distance). On the other hand, use of the golf ball resin composition having a hardness of 80 or smaller in shore D hardness provides the golf ball excellent in the shot feeling. Here, a hardness of the golf ball resin composition is a slab hardness of the golf ball resin composition that is molded into a sheet form. The method for the measurement is described later.

The golf ball resin composition of the present invention preferably has the melt flow rate (190° C., 2.16 kg) of 0.01 g/10 min or more, more preferably 0.05 g/10 min or more, and even more preferably 0.1 g/10 min or more, and preferably has the melt flow rate (190° C., 2.16 kg) of 100 g/10 min or less, more preferably 80 g/10 min or less, and even more preferably 50 g/10 min or less. If the golf ball resin composition has the melt flow rate in the above range, the moldability into the golf ball constituent member is good.

The golf ball resin composition preferably has a bending stiffness of 10 MPa or more, more preferably 15 MPa or more, even more preferably 20 MPa or more, and preferably has a bending stiffness of 450 MPa or less, more preferably 400 MPa or less, even more preferably 350 MPa or less. Use of the golf ball resin composition having a bending stiffness of 10 MPa or more provides the golf ball excellent in the resilience (flying distance). On the other hand, if the bending stiffness is 450 MPa or less, the obtained golf ball becomes appropriately soft and thus the shot feeling becomes good.

The golf ball resin composition of the present invention preferably has a rebound resilience of 40% or more, more preferably 43% or more, even more preferably 46% or more. Use of the golf ball resin composition having a rebound resilience of 40% or more provides the golf ball excellent in the resilience (flying distance). Here, the bending stiffness and the rebound resilience of the golf ball resin composition are measured by molding the golf ball resin composition into a sheet form. The methods for the measurement are described later.

The golf ball of the present invention is not limited, as long as it comprises a constituent member formed from the golf ball resin composition of the present invention. For example, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least one intermediate layer disposed around the center, and a cover disposed around the core (including the three-piece golf ball mentioned above), any one of constituent members is formed from the above golf ball resin composition. In one preferable embodiment, the golf ball comprises a core composed of at least one layer and a cover disposed around the core, wherein at least one layer of the core is formed from the golf ball resin composition of the present invention. Among them, the golf ball having an intermediate layer formed from the golf ball resin composition of the present invention is preferred.

In the following, the present invention will be explained based on the golf ball that comprises a core, at least one intermediate layer disposed around the core, and a cover disposed around the cover (including a three-piece golf ball), wherein at least one of the intermediate layer is formed from the golf ball resin composition of the present invention. However, the present invention is not limited to this embodiment.

In the preferable embodiment, the construction of the core may be a single-layered core or a multi-layered core.

The core generally has the spherical shape, but the core may be provided with a rib on the surface thereof so that the surface of the spherical core is divided by the ribs. For example, the surface of the spherical core is evenly divided by the ribs. In one embodiment, the ribs are preferably formed on the surface of the spherical core in an integrated manner. The ribs are preferably formed along an equatorial line and meridians that evenly divide the surface of the spherical core, if the spherical core is assumed as the earth. For example, if the surface of the spherical core is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape.

A conventionally known rubber composition (hereinafter, sometimes simply referred to as "core rubber composition") may be employed for the core of the golf ball of the present invention, and the core can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior resilience property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 part by mass, the core becomes too soft, and the resilience tends to be lowered, and if the amount is more than 5 parts by mass, the amount of the co-crosslinking agent must be increased in order to obtain the appropriate hardness, which tends to cause the insufficient resilience.

The co-crosslinking agent is considered to have an action of crosslinking a rubber molecule by graft polymerization to a base rubber molecular chain. As the co-crosslinking agent, preferred is, for example, an $\alpha,\beta$-unsaturated carboxylic acid having 3 to 8 carbon atoms or a metal salt thereof, more preferably acrylic acid, methacrylic acid or a metal salt thereof. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less, based on 100 parts of the base rubber by mass. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 55 parts by mass, the core becomes too hard, so that the shot feeling may be lowered.

The filler contained in the core rubber composition is mainly blended as a weight adjusting agent in order to adjust the weight of the golf ball obtained as the final product, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and is preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

As the core rubber composition, an organic sulfur compound, an antioxidant or a peptizing agent may be blended appropriately in addition to the base rubber, the crosslinking initiator, the co-crosslinking agent and the filler.

Examples of the organic sulfur compound include thiophenols, thionaphthols, polysulfides, thiocarboxylic acids, dthiocarboxylic acids, sulfenamindes, thiurams, dithiocarbamates, thiazoles, and the like. Among them, diphenyl disulfide or derivative thereof may be preferably used as the organic sulfur compound. Examples of the diphenyl disulfide or the derivative thereof include diphenyl disulfide; mono-substituted diphenyl disulfides such as bis(4-chlorophenyl)disulfide, bis(3-chlorophenyl)disulfide, bis(4-bromophenyl)disulfide, bis(3-bromophenyl)disulfide, bis(4-fluorophenyl) disulfide, bis(4-iodophenyl)disulfide and bis(4-cyanophenyl) disulfide; di-substituted diphenyl disulfides such as bis(2,5-dichlorophenyl)disulfide, bis(3,5-dichlorophenyl)disulfide, bis(2,6-dichlorophenyl)disulfide, bis(2,5-dibromophenyl) disulfide, bis(3,5-dibromophenyl)disulfide, bis(2-chloro-5-bromophenyl)disulfide, and bis(2-cyano-5-bromophenyl) disulfide; tri-substituted diphenyl disulfides such as bis(2,4,6-trichlorophenyl)disulfide, and bis(2-cyano-4-chloro-6-bromophenyl)disulfide; tetra-substituted diphenyl disulfides such as bis(2,3,5,6-tetra chlorophenyl)disulfide; penta-substituted diphenyl disulfides such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide or bis(pentabromophenyl)disulfide is preferably used since the golf ball having particularly high resilience can be obtained. The amount of the organic sulfur compound to be blended is preferably 0.1 part by mass or more, more preferably 0.3 part by mass or more, and is preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The core can be obtained by mixing, kneading the above mentioned rubber composition and molding the core rubber composition in the mold. The conditions for press-molding the core rubber composition should be determined depending on the rubber composition. Specifically, the press-molding is preferably carried out for 10 to 60 minutes at the temperature of 130° C. to 200° C. under the pressure from 2.9 MPa to 11.8 MPa. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

The diameter of the core is preferably 34.8 mm or more, more preferably 35.0 mm or more, and even more preferably 35.2 mm or more, and is preferably 41.2 mm or less, more preferably 41.0 mm or less, and even more preferably 40.8 mm or less. If the diameter of the core is 34.8 mm or more, the intermediate layer or the cover layer does not become excessively thick, and hence the resilience of the golf ball becomes better. On the other hand, if the diameter of the core is 41.2 mm or less, the intermediate layer or the cover does not become excessively thin, and hence the intermediate layer or the cover functions better.

When the core has a diameter from 34.8 mm to 41.2 mm, a compression deformation amount (shrinking deformation amount of the core along the compression direction) of the core when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling becomes good, while if the compression deformation amount is 4.00 mm or less, the resilience becomes better.

The center hardness of the core is preferably 30 or larger, more preferably 32 or larger, and even more preferably 35 or larger in Shore D hardness. If the center hardness is smaller than 30 in Shore D hardness, the core becomes so soft that the resilience of the golf ball tends to become lower. The center hardness of the core is preferably 50 or smaller, more preferably 48 or smaller, and even more preferably 45 or smaller in Shore D hardness. If the center hardness is more than 50 in Shore D hardness, the core becomes too hard, resulting in the poor shot feeling. In the present invention, the center hardness of the core is the hardness measured with the Shore D type spring hardness tester at the central point of a cut plane of a core which has been cut into two halves.

The surface hardness of the core is preferably 45 or larger, more preferably 50 or larger, and even more preferably 55 or larger, and is preferably 65 or smaller, more preferably 62 or smaller, even more preferably 60 or smaller in Shore D hardness. If the surface hardness is 45 or more in Shore D hardness, the core does not become so soft and the better resilience is obtained. If the surface hardness is 65 or less in Shore D hardness, the core does not become so hard and the better shot feeling is obtained.

In the preferable embodiment, as a method to form an intermediate layer, the intermediate layer is formed by covering the core with the golf ball resin composition of the present invention (hereinafter, sometimes merely referred to as "intermediate layer composition"). An embodiment for molding the intermediate layer is not particularly limited, and includes an embodiment which comprises injection molding the intermediate layer composition directly onto the core, or an embodiment which comprises molding the intermediate layer composition into a half hollow-shell, covering the core with the two half hollow-shells, and subjecting the core with the two half hollow-shells to the compression-molding at the temperature of 130° C. to 170° C. for 1 to 5 minutes. The intermediate layer of the golf ball of the present invention is preferably formed by injection molding. The intermediate layer can be produced more easily by injection molding.

In the case of directly injection molding the intermediate layer composition onto the core, it is preferred to use upper and lower molds having a spherical cavity and pimples for forming the intermediate layer, wherein a part of the pimple also serves as a retractable hold pin. When forming the intermediate layer by injection molding, the hold pin is protruded to hold the core, and the intermediate layer composition which has been heated and melted is charged and then cooled to obtain the intermediate layer.

When molding the intermediate layer in a compression molding method, molding of the half shell can be performed by either compression molding method or injection molding method, and the compression molding method is preferred. The compression-molding of the intermediate layer composition into half shell can be carried out, for example, under a pressure of 1 MPa or more and 20 MPa or less at a temperature of −20° C. or more and 70° C. or less relative to the flow beginning temperature of the intermediate layer composition. By performing the molding under the above conditions, a half shell having a uniform thickness can be formed. Examples of a method for molding the intermediate layer using half shells include compression molding by covering the core with two half shells. The compression molding of half shells into the intermediate layer can be carried out, for example, under a pressure of 0.5 MPa or more and 25 MPa or less at a temperature of −20° C. or more and 70° C. or less relative to the flow beginning temperature of the intermediate layer composition. By performing the molding under the above conditions, the intermediate layer having a uniform thickness can be formed.

The molding temperature means the highest temperature where the temperature at the surface of the concave portion of the lower mold reaches from closing through opening the molds. Further, the flow beginning temperature of the intermediate layer composition can be measured in a pellet form under the following conditions by using a flow characteristics evaluation apparatus (Flow Tester CFT-500, manufactured by Shimadzu Corporation).
Measuring conditions: Area size of a plunger: 1 cm$^2$, Die length: 1 mm, Die diameter: 1 mm, Load: 588.399 N, Start temperature: 30° C., and Temperature increase rate: 3° C./min.

The thickness of the intermediate layer is preferably 0.5 mm or more, more preferably 0.6 mm or more, even more preferably 0.7 mm or more. If the thickness of the intermediate layer is 0.5 mm or more, it is easier to mold the intermediate layer. Further, the durability of the resultant golf ball is enhanced. The thickness of the intermediate layer is preferably 15 mm or less, more preferably 14 mm or less, and even more preferably 13 mm or less. If the thickness of the intermediate layer is 15 mm or less, the resilience and shot feeling of the golf ball are improved.

In one preferable embodiment that the golf ball of the present invention has at least two intermediate layers, the golf ball may have an intermediate layer which is formed from an intermediate layer composition different from the golf ball resin composition of the present invention to the extent that the effect of the present invention does not deteriorate, as long as at least one of the intermediate layer is formed from the golf ball resin composition of the present invention. In this case, it is preferred that the outermost layer is the intermediate layer formed from the golf ball resin composition of the present invention. Also, it is more preferred that all the intermediate layers are formed from the golf ball resin composition of the present invention.

Examples of the intermediate layer composition which is different from the golf ball resin composition of the present invention include, a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" commercially available from BASF Japan Ltd., a thermoplastic styrene elastomer having a trade name "Rabalon (registered trademark)" commercially available from Mitsubishi Chemical Corporation, and the like, in addition to the core rubber composition described above and the ionomer resin. Further, the intermediate layer composition may contain a weight adjusting agent such as barium sulfate, tungsten, or the like; an antioxidant; a pigment; or the like.

In one preferable embodiment, the cover of the golf ball of the present invention is formed from a cover composition containing a resin component. The resin component includes, for example, an ionomer resin; a thermoplastic polyurethane elastomer having a commercial name of "Elastollan (registered trademark) (e.g. "Elastollan XNY97A")" commercially available from BASF Japan Ltd.; a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic styrene elastomer having a commercial name of "Rabalon (registered trademark) (e.g. "Rabalon T3221C")" commercially available from Mitsubishi Chemical Corporation. Further, (A) a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms, and an α,β-unsaturated carboxylic acid ester can be also used. These resin components are used solely or as a mixture of at least two of them.

In one preferable embodiment, a cover composition constituting a cover of the golf ball preferably contains the polyurethane elastomer or the ionomer resin, as the resin component. The content of the polyurethane elastomer or the ionomer resin in the resin component of the cover composition is preferably 50 mass % or more, more preferably 60 mass % or more, even more preferably 70 mass % or more.

In the present invention, in addition to the aforementioned resin component, the cover composition may further contain a pigment component such as a white pigment (for example, titanium oxide), a blue pigment, a red pigment, or the like; a specific gravity adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the cover. If the amount of the white pigment is more than 10 parts by mass, the durability of the cover may deteriorate.

The cover composition preferably has a slab hardness of 70 or less, more preferably 68 or less, even more preferably 65 or less in Shore D hardness. If the cover composition has a slab hardness of 70 or less, the spin rate on the approach shots with short irons increases. As a result, the golf ball having a good controllability on the approach shots is obtained. In order to ensure the spin rate sufficiently for the approach shots, the cover composition preferably has a slab hardness of 20 or more, more preferably 25 or more, even more preferably 30 or more in Shore D hardness.

An embodiment for molding a cover is not particularly limited, and includes an embodiment which comprises injection molding the cover composition directly onto the intermediate layer, or an embodiment which comprises molding the cover composition into a hollow-shell, covering the intermediate layer with a plurality of the hollow-shells and subjecting to the compression-molding (preferably an embodiment which comprises molding the cover composition into a half hollow-shell, covering the core with the two half hollow-shells and subjecting to the compression-molding).

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the intermediate layer with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition, the cover composition extruded in the pellet form beforehand may be used for injection molding or the cover materials such as the base resin components and the pigment may be dry blended, followed by directly injection molding the blend material. It is preferred to use upper and lower molds having a spherical cavity and pimples for forming a cover, wherein a part of the pimple also serves as a retractable hold pin. When forming the cover by injection molding, the hold pin is protruded to hold the sphere covered with the intermediate layer, and the cover composition which has been heated and melted is charged and then cooled to obtain a cover. For example, the cover composition heated and melted at the temperature of 200° C. to 250° C. is charged into a mold held under the pressure of 9 MPa to 15 MPa for 0.5 to 5 second. After cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, most preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the abrasion resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

When the golf ball of the present invention has a diameter in a range from 40 mm to 45 mm, a compression deformation amount of the golf ball (an amount of compression of the golf ball in the compression direction thereof) when applying a load from an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. On the other hand, if the compression deformation amount is 4.0 mm or less, the resilience is enhanced.

The present invention is explained based on the embodiment where the golf ball resin composition of the present invention is used for the intermediate layer, but the golf ball resin composition of the present invention may be used as the cover composition.

EXAMPLES

Hereinafter, the present invention will be described in detail by way of example. The present invention is not limited to examples described below. Various changes and modifications can be made without departing from the spirit and scope of the present invention.

(1) Hardness of Core (Shore D Hardness)

A type P1 auto loading durometer manufactured by Kobunshi Keiki Co., Ltd., provided with a Shore D type spring hardness tester prescribed in ASTM-D2240 was used to measure the surface hardness and the center hardness of the core. Shore D hardness measured at the surface of the spherical core was adopted as the surface hardness of the spherical core. The spherical core was cut into two hemispheres to obtain a cut plane, and Shore D hardness measured at the central point of the cut plane was adopted as the center hardness of the core.

(2) Slab Hardness (Shore D Hardness)

Sheets with a thickness of about 2 mm were produced by injection molding the cover composition and the intermediate layer composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(3) Compression Deformation Amount (mm)

A compression deformation amount of the core and golf ball (a shrinking amount of the core and golf ball in the compression direction thereof), when applying a load from 98 N as an initial load to 1275 N as a final load to the core and golf ball, was measured.

(4) Rebound Resilience (%)

A sheet with a thickness of about 2 mm was produced by a hot press molding the golf ball resin composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.

(5) Durability

A metal-head W#1 driver ("XXIO" manufactured by SRI sports, Shaft hardness: S, loft angle: 11°) was installed on a swing robot M/C manufactured by TRUETEMPER CO, and the head speed was set to 45 m/sec. Each golf ball was stored in a constant temperature reservoir kept at the temperature of 23° C. for 12 hours. Immediately after taking each golf ball out of the reservoir, they were repeatedly hit with the driver. The number of hits required to break the golf ball was counted. This measurement was conducted by using twelve golf balls for each golf ball. The number of hits for golf ball No. 7 was defined as an index of 100, and the durability of each golf ball was represented by converting the number of hits for each golf ball into this index. A greater index value indicates that the durability of the golf ball is excellent.

(6) Coefficient of Restitution

A 198.4 g of metal cylindrical object was forced to collide with each spherical body at a speed of 40 m/sec, and the speeds of the cylindrical object and the golf ball before and after the collision were measured. Based on these speeds and the mass of each object, coefficient of restitution for each golf ball was calculated. The measurement was conducted by using twelve samples for each golf ball, and the average value was regarded as the coefficient of restitution for the golf ball. The coefficient of restitution for golf ball No. 7 was defined as an index of 100, and the coefficient of restitution of each golf ball was represented by converting the coefficient of restitution for each golf ball into this index.

[Production of Golf Balls]

(1) Production of Core

The core rubber composition having the formulation shown in Table 1 was kneaded and heat-pressed in upper and lower molds, each having a hemispherical cavity, at 170° C. for 15 minutes to prepare a spherical core. The amount of barium sulfate was adjusted appropriately to make a golf ball have a weight of 45.4 g.

TABLE 1

| Core rubber composition | Formulation (Parts by mass) |
|---|---|
| Polybutadiene rubber | 100 |
| Zinc acrylate | 25 |
| Zinc oxide | 5 |
| Dicumyl peroxide | 0.9 |
| Diphenyl disulfide | 0.5 |
| Barium sulfate | Appropriate Amount*) |
| Core Diameter (mm) | 38.8 |
| Core compression deformation amount (mm) | 4.0 |
| Core center hardness (Shore D) | 40 |
| Core surface hardness (Shore D) | 49 |

*)Depending on the cover composition, adjustment was made such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Dicumyl peroxide: "Percumyl (registered trademark) D" manufactured by NOF Corporation.
Diphenyl disulfide: Sumitomo Seika Chemicals Co., Ltd.

(2) Preparation of Cover Composition and Intermediate Layer Composition

Blending materials shown in Tables 2 and 3 were mixed with a twin-screw kneading extruder to prepare the intermediate layer composition and cover compositions in the pellet form, respectively. The extruding conditions for the intermediate layer composition were a screw diameter of 45 mm, a screw rotational speed of 200 rpm, and screw L/D=35, and the cylinder temperature of 160° C. to 230° C. The extruding conditions for the cover composition were a screw diameter of 45 mm, a screw rotational speed of 200 rpm, and screw L/D=35, and the mixtures were heated to 160° C. to 230° C. at the die position of the extruder.

TABLE 2

| Cover composition | Formulation (parts by mass) |
|---|---|
| Himilan 1605 | 50 |
| Himilan AM7329 | 50 |
| Titanium oxide | 4 |
| Slab hardness (Shore D) | 65 |

Himilan 1605: an ionomer resin of a sodium ion-neutralized ethylene-methacrylic acid copolymer, available from MITSUI-DUPONT POLYCHEMICAL
Himilan AM7329: an ionomer resin of a zinc ion-neutralized ethylene-methacrylic acid copolymer, available from MITSUI-DUPONT POLYCHEMICAL
Titanium oxide: A220 available from Ishihara Sangyo Kaisha, Ltd.

(3) Production of Golf Ball Body

The intermediate layer compositions were injection-molded onto the cores obtained above to form the intermediate layers covering the cores. Subsequently, golf balls were produced by injection-molding the cover composition onto the intermediate layer to form the cover. Upper and lower molds for the intermediate layer and the cover have a spherical cavity with pimples, a part of pimples serves as a hold pin which is retractable.

Upper and lower molds for the intermediate layer have a spherical cavity with pimples, a part of pimples serves as a hold pin which is retractable. When molding the intermediate layer, the hold pins were protruded to hold the core after the core was put in. The intermediate layer composition was heated to 200° C. to 260° C. at the cylinder portion of the injection unit and charged into the mold held under a pressure of 15 MPa, and cooled for 30 seconds. Then, the mold was opened, and the spherical bodies having the intermediate layer formed were taken out from the mold.

When molding the cover, the hold pins were protruded to hold the spherical bodies having the intermediate layer formed after they were put in the mold, the cover composition heated to 260° C. was charged into the mold under a pressure of 80 tons within 0.3 second, and cooled for 30 seconds. Then, the mold was opened, and the golf ball bodies were taken out from the mold. The surface of the obtained golf ball bodies were treated with sandblast, marked, and painted with a clear paint. The paint was dried in an oven at 40° C. to form a paint film, and golf balls having a diameter of 42.8 mm and a mass of 45.4 g were obtained. The results of evaluations with respect to the compression deformation amount and resilience of the golf balls were also shown in table 3.

TABLE 3

| | | | | Golf ball No. | | | | | | | | |
|---|---|---|---|---|---|---|---|---|---|---|---|---|
| | | | | 1 | 2 | 3 | 4 | 5 | 6 | 7 | 8 | 9 |
| Golf ball resin composition | Formulation (parts by mass) | (A) | Himilan AM7327 (Zn) | 100 | 100 | 100 | 100 | 100 | — | 100 | 100 | 100 |
| | | | Nucrel AN4319 | — | — | — | — | — | 100 | — | — | — |
| | | (B) | Basic Mg stearate (metal content: 1.5 mole %) | 70 | — | — | — | — | — | — | — | — |
| | | | Basic Mg behenate (metal content: 1.6 mole %) | — | — | — | 32 | — | — | — | — | — |
| | | | Basic Mg laurate (metal content: 1.5 mole %) | — | 30 | 70 | — | — | — | — | — | — |
| | | | Basic Mg oleate (metal content: 1.7 mole %) | — | — | — | — | 30 | 70 | — | — | — |
| | | | Mg Behenate | — | — | — | — | — | — | 30 | 30 | — |
| | | | Behenic acid | — | — | — | — | — | — | — | — | 29 |
| | | | Magnesium hydroxide | — | — | — | — | — | — | — | 1.5 | 3.9 |
| | Properties | | Slab hardness (Shore D) | 53 | 50 | 52 | 53 | 50 | 51 | 51 | 52 | 49 |
| | | | Rebound resilience (%) | 61 | 65 | 64 | 59 | 71 | 70 | 58 | 57 | 54 |
| | | | Intermediate layer thickness (mm) | 1.0 | 1.0 | 1.0 | 1.0 | 1.0 | 1.0 | 1.0 | 1.0 | 1.0 |
| Features of Golf balls | | | Cover thickness (mm) | 1.0 | 1.0 | 1.0 | 1.0 | 1.0 | 1.0 | 1.0 | 1.0 | 1.0 |
| | | | Compression deformation amount (mm) | 3.13 | 3.16 | 3.13 | 3.13 | 3.15 | 3.15 | 3.15 | 3.14 | 3.17 |
| | | | Coefficient Restitution | 100.2 | 100.3 | 100.3 | 100.2 | 100.4 | 100.5 | 100.0 | 99.9 | 99.3 |
| | | | Durability | 114 | 110 | 117 | 108 | 113 | 120 | 100 | 94 | 90 |

HIMILAN AM7327: Zinc ion neutralized ethylene-methacrylic acid-butyl acrylate ternary copolymer ionomer resin (Melt Flow Rate (190° C., 2.16 kg): 0.7 g/10 min, Bending stiffness: 35 MPa) available from Du Pont-Mitsui Polychemicals Co., Ltd.
Nucrel AN4319: Ethylene-methacrylic acid-butyl acrylate copolymer (Melt flow rate (190° C., 2.16 kg): 55 g/10 min, Bending stiffness: 21 MPa) available from Du Pont-Mitsui Polychemicals Co., Ltd.
Basic stearic acid magnesium: Nitto kasei Kougyo Co., Ltd. (metal content: 1.5 mole %, in the formula (1), $M^1 = M^2 = Mg$, R = 17 carbon atoms)
Basic behenic acid magnesium: Nitto kasei Kougyo Co., Ltd. (metal content: 1.6 mole %, in the formula (1), $M^1 = M^2 = Mg$, R = 21 carbon atoms)
Basic lauric acid magnesium: Nitto kasei Kougyo Co., Ltd. (metal content: 1.5 mole %, in the formula (1), $M^1 = M^2 = Mg$, R = 11 carbon atoms)
Basic oleic acid magnesium: Nitto kasei Kougyo Co., Ltd. (metal content: 1.7 mole %, in the formula (1), $M^1 = M^2 = Mg$, R = 17 carbon atoms)
Magnesium behenate: Nitto kasei Kougyo Co., Ltd.
Behenic acid: NOF Corporation.
Magnesium hydroxide: Wako Pure Chemical Industries, Ltd.
Titanium oxide: A220 available from Ishihara Sangyo Co., Ltd.

As is apparent from Table 3, it notes that a golf ball resin composition comprising (A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and (B) a basic metal salt of a fatty acid is excellent in resilience. Further, a golf ball using the golf ball resin composition of the present invention has an excellent resilience and durability.

The golf ball resin composition of the present invention is useful for an intermediate layer of a golf ball. This application is based on Japanese Patent Application No. 2011-289986 filed on Dec. 28, 2011, the contents of which are hereby incorporated by reference.

What is claimed is:

1. A golf ball resin composition comprising:
(A) at least one resin component selected from the group consisting of
   (a-1) a binary copolymer composed of an olefin and an α,β-unsaturated carboxylic acid having 3 to 8 carbon atoms,
   (a-2) an ionomer resin consisting of a metal ion-neutralized product of a binary copolymer composed of an olefin and an α,β-unsaturated carboxylic acid having 3 to 8 carbon atoms,
   (a-3) a ternary copolymer composed of an olefin, an α,β-unsaturated carboxylic acid having 3 to 8 carbon atoms and an α,β-unsaturated carboxylic acid ester, and
   (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and
(B) a basic metal salt of a fatty acid,
   wherein the golf ball resin composition contains (B) the basic metal salt of the fatty acid in an amount ranging from 25 parts by mass to 100 parts by mass with respect to 100 parts by mass of (A) the resin component, and
   wherein (B) the basic metal salt of the fatty acid is represented by a following general formula (1):

$$mM^1O.M^2(RCOO)_2 \qquad (1)$$

wherein m ranges from 0.5 to 2.0, RCOO represents a residue of the fatty acid, and $M^1$ and $M^2$ are metals of Group II or Group XII of the periodic table, respectively.

2. The golf ball resin composition according to claim 1, wherein (B) the basic metal salt of the fatty acid is a basic metal salt of a fatty acid having 8 to 30 carbon atoms.

3. The golf ball resin composition according to claim 1, wherein the golf ball resin composition contains (B) the basic metal salt of the fatty acid in an amount ranging from 25 parts to 70 parts by mass with respect to 100 parts by mass of (A) the resin component.

4. The golf ball resin composition according to claim 1, wherein (B) the basic metal salt of the fatty acid includes at least one component selected from the group consisting of lauric acid, stearic acid, behenic acid, oleic acid, and erucic acid as a fatty acid component.

5. The golf ball resin composition according to claim 1, wherein the metal component of (B) the basic metal salt of the fatty acid includes magnesium, calcium, zinc or barium.

6. The golf ball resin composition according to claim 1, wherein $M^1$ and $M^2$ are magnesium.

7. The golf ball resin composition according to claim 1, wherein the golf ball resin composition has a rebound resilience of 40% or more.

8. The golf ball resin composition according to claim 1, wherein the golf ball resin composition has a slab hardness ranging from 20 to 80 in Shore D hardness.

9. A golf ball comprising a core, at least one intermediate layer disposed around the core, and a cover disposed around the intermediate layer, wherein at least one intermediate layer is formed from a golf ball resin composition comprising:
(A) at least one resin component selected from the group consisting of
  (a-1) a binary copolymer composed of an olefin and an α,β-unsaturated carboxylic acid having 3 to 8 carbon atoms,
  (a-2) an ionomer resin consisting of a metal ion-neutralized product of a binary copolymer composed of an olefin and an α,β-unsaturated carboxylic acid having 3 to 8 carbon atoms,
  (a-3) a ternary copolymer composed of an olefin, an α,β-unsaturated carboxylic acid having 3 to 8 carbon atoms and an α,β-unsaturated carboxylic acid ester, and
  (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and
(B) a basic metal salt of a fatty acid,
  wherein the golf ball resin composition contains (B) the basic metal salt of the fatty acid in an amount ranging from 25 parts by mass to 100 parts by mass with respect to 100 parts by mass of (A) the resin component, and
  wherein (B) the basic metal salt of the fatty acid is represented by a following general formula (1):

$$mM^1O.M^2(RCOO)_2 \qquad (1)$$

wherein m ranges from 0.5 to 2.0, RCOO represents a residue of the fatty acid, and $M^1$ and $M^2$ are metals of Group II or Group XII of the periodic table, respectively.

10. The golf ball according to claim 9, wherein (B) the basic metal salt of the fatty acid is a basic metal salt of a fatty acid having 8 to 30 carbon atoms.

11. The golf ball according to claim 9, wherein the golf ball resin composition contains (B) the basic metal salt of the fatty acid in an amount ranging from 25 parts to 70 parts by mass with respect to 100 parts by mass of (A) the resin component.

12. The golf ball according to claim 9, wherein (B) the basic metal salt of the fatty acid includes at least one component selected from the group consisting of lauric acid, stearic acid, behenic acid, oleic acid, and erucic acid as a fatty acid component.

13. The golf ball according to claim 9, wherein the metal component of (B) the basic metal salt of the fatty acid includes magnesium, calcium, zinc or barium.

14. The golf ball according to claim 9, wherein $M^1$ and $M^2$ are magnesium.

15. The golf ball according to claim 9, wherein the golf ball resin composition has a rebound resilience of 40% or more.

16. The golf ball according to claim 9, wherein the golf ball resin composition has a slab hardness ranging from 20 to 80 in Shore D hardness.

17. The golf ball according to claim 9, wherein the intermediate layer has a thickness ranging from 0.5 mm to 15 mm.

18. The golf ball according to claim 9, wherein the core is formed from a rubber composition.

* * * * *